(12) United States Patent
Gren (10) Patent No.: US 11,120,110 B2
(45) Date of Patent: Sep. 14, 2021

(54) AUTHENTICATING A USER WITH A MOBILE APPARATUS

(71) Applicant: Microsoft Technology Licensing, LLC., Redmond, WA (US)

(72) Inventor: Juuso Gren, Kyröskoski (FI)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days.

(21) Appl. No.: 14/605,717

(22) Filed: Jan. 26, 2015

(65) Prior Publication Data

US 2016/0219434 A1 Jul. 28, 2016

(51) Int. Cl.
| | | |
|---|---|---|
| *H04M 1/66* | (2006.01) | |
| *G06F 21/32* | (2013.01) | |
| *H04W 12/06* | (2021.01) | |
| *H04L 29/06* | (2006.01) | |

(52) U.S. Cl.
CPC .......... *G06F 21/32* (2013.01); *H04W 12/068* (2021.01); *H04L 63/0861* (2013.01)

(58) Field of Classification Search
CPC ............... H04W 12/06; G07C 9/00087; G07C 9/00309; G07C 9/00158; G07C 9/00111; G08B 3/10; G08B 13/08; B60R 25/04; G06F 21/36; G06F 21/32; G06F 1/3203; G06F 21/31; G06F 21/86; G06Q 10/087; A61B 1/041; A61B 3/113; H04N 5/272; H04N 7/18; G02C 13/005; G06T 2207/10016; G06K 9/00228; G06K 9/00597; G06K 9/6202; G05B 2219/25045; G10L 17/005
USPC ...... 455/411; 340/5.83, 540, 5.2, 5.31, 5.52, 340/5.8, 5.81, 5.82, 686.1, 5.1, 5.92; 348/77, 239, 78, E78.5; 351/204; 382/103, 118, 115, 116, 117, 218; 700/13; 704/246; 713/186, 323; 726/17, 726/34, 7
See application file for complete search history.

(56) References Cited

U.S. PATENT DOCUMENTS

| | | |
|---|---|---|
| 8,149,089 B2 | 4/2012 | Lin et al. |
| 8,235,529 B1 | 8/2012 | Raffle et al. |
| 8,411,909 B1 | 4/2013 | Zhao et al. |

(Continued)

FOREIGN PATENT DOCUMENTS

| | | |
|---|---|---|
| CN | 102402661 A | 4/2012 |
| CN | 105122267 A | 12/2015 |

(Continued)

OTHER PUBLICATIONS

Gonzalez, Neil, "How to Use the Much-Improved Face Unlock Feature in Android Lollipop", Nov. 25, 2014 Available at: "http://nexus7.wonderhowto.com/how-to/use-much-improved-face-unlock-feature-android-lollipop-0158161/".

(Continued)

*Primary Examiner* — Jinsong Hu
*Assistant Examiner* — Alexander J Yi (57) ABSTRACT

A mobile apparatus is described. When the mobile apparatus is in a locked state and a user is detected, the user is authenticated automatically on background using a primary biometric authentication method. In response to authenticating the user automatically on background, the locked state of the mobile apparatus is opened, and a screen relating to the locked state on a display is provided although the locked state has been opened.

20 Claims, 4 Drawing Sheets

(56) References Cited

U.S. PATENT DOCUMENTS

| | | |
|---|---|---|
| 8,515,139 B1 | 8/2013 | Nechyba et al. |
| 8,576,071 B2 | 11/2013 | Lo et al. |
| 8,594,374 B1 | 11/2013 | Bozarth |
| 8,627,096 B2 | 1/2014 | Azar et al. |
| 9,721,107 B2 | 8/2017 | Han et al. |
| 2005/0197103 A1 | 9/2005 | Inoue |
| 2009/0158423 A1 | 6/2009 | Orlassino et al. |
| 2009/0283583 A1* | 11/2009 | Cowburn .............. G06Q 10/087 235/375 |
| 2010/0269153 A1* | 10/2010 | Kato ....................... G06F 21/31 726/3 |
| 2011/0157347 A1 | 6/2011 | Kalocsai |
| 2012/0235790 A1* | 9/2012 | Zhao ....................... G06F 21/32 340/5.83 |
| 2012/0293438 A1* | 11/2012 | Chaudhri ............ G06F 3/04883 345/173 |
| 2013/0198832 A1 | 8/2013 | Draluk et al. |
| 2014/0056491 A1 | 2/2014 | Knight |
| 2014/0066017 A1* | 3/2014 | Cho .................. H04M 1/72519 455/411 |
| 2014/0128032 A1* | 5/2014 | Muthukumar .... H04M 1/72569 455/411 |
| 2014/0169641 A1 | 6/2014 | Lee et al. |
| 2014/0283128 A1* | 9/2014 | Shepherd ................ G06F 21/74 726/28 |
| 2015/0213504 A1* | 7/2015 | Katz .................. G06Q 30/0272 705/14.64 |

FOREIGN PATENT DOCUMENTS

| | | |
|---|---|---|
| EP | 2192519 A1 | 6/2010 |
| WO | 2004057523 A1 | 7/2004 |

OTHER PUBLICATIONS

"International Search Report & Written Opinion Issued in PCT Application No. PCT/US2016/013982", dated Mar. 24, 2016, 10 Pages.

"Second Written Opinion Issued in PCT Application No. PCT/US2016/013982", dated Jan. 2, 2017, 5 Pages.

"International Preliminary Report on Patentability Issued in PCT Application No. PCT/US2016/013982", dated Apr. 7, 2017, 6 Pages.

"Office Action Issued in European Patent Application No. 16702862.0", dated Dec. 17, 2019, 4 Pages.

"Office Action Issued in European Patent Application No. 16702862.0", dated Jan. 4, 2019, 4 Pages.

"First Office Action and Search Report Issued in Chinese Patent Application No. 201680006180.1", dated Aug. 19, 2019, 15 Pages.

"Second Office Action Issued in Chinese Patent Application No. 201680006180.1", dated Apr. 21, 2020, 11 Pages.

"Office Action Issued in European Patent Application No. 16702862.0", dated Jul. 31, 2020, 7 Pages.

"Office Action Issued in Chinese Patent Application No. 201680006180.1", dated Aug. 5, 2020, 6 Pages.

* cited by examiner

AUTHENTICATING A USER WITH A MOBILE APPARATUS

BACKGROUND

Mobile devices, for example, smart phones may use a locking function to prevent the use of the mobile device by non-authorized users. The unlocking of the mobile devices may be done, for example, with a code by the user of the mobile device. Other means for unlocking the mobile device includes, for example, authenticating the user by using iris authentication, facial recognition or fingerprint authentication.

SUMMARY

This Summary is provided to introduce a selection of concepts in a simplified form that are further described below in the Detailed Description. This summary is not intended to identify key features or essential features of the claimed subject matter, nor is it intended to be used to limit the scope of the claimed subject matter.

A mobile apparatus comprises a display, at least one processor, and at least one memory storing program instructions that, when executed by the at least one processor, cause the mobile apparatus to detect a user, the mobile apparatus being in a locked state; authenticate the user automatically on background using a primary biometric authentication method; open the locked state in response to authenticating the user automatically on background; and provide a screen relating to the locked state on the display although the locked state has been opened.

Many of the attendant features will be more readily appreciated as they become better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. However, the same or equivalent functions and sequences may be accomplished by different examples.

Figure 1:
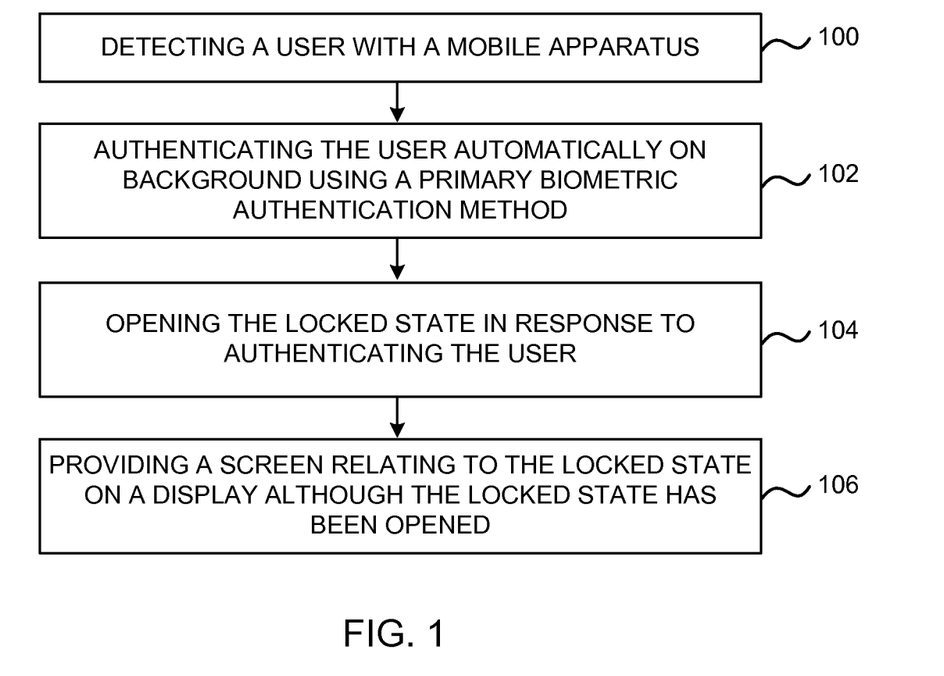
FIG. 1 is an example flow diagram of a method for unlocking a mobile apparatus.

FIG. 1 is an example flow diagram of a method for unlocking a mobile apparatus. The mobile apparatus is, for example, a smart phone, a mobile phone, a tablet computer etc. At 100, the mobile apparatus detects the user while the mobile apparatus is in a locked state. The user may be detected using any appropriate technique or sensor, for example, a touch-sensitive screen of the mobile apparatus, a camera, an acceleration sensor, a sensor detecting grip of the user when the user holds the mobile apparatus in this hand etc. The term "locked state" refers to a state of the mobile apparatus where the user needs to be somehow authenticated before he is able to fully use the mobile apparatus. At 102, the user is authenticated with the mobile apparatus automatically on background using a primary biometric authentication method. The primary biometric authentication method refers, for example, to iris authentication, authentication based on facial recognition or fingerprint authentication. The term "on background" means that the primary biometric authentication process starts automatically and the user need not initiate the authentication process manually.

At 104 the locked state of the mobile apparatus is opened in response to authenticating the user automatically on background. Opening the locked state means that the user need not do any other actions to be able to fully use all functions of the mobile apparatus. At 106 a screen relating to the locked state is provided on a display of the mobile apparatus although the locked state has been opened. The term "screen relating to the locked state" may refer to a view, for example, to a glance screen showing some basic information on the display, to a fully lighted screen showing some basic information on the display but not showing the normal operating system view or a view relating to a specific application (for example, a web browser, an email client application, a camera application etc.), or to a lock screen normally preceding the screen when an identification code or pattern is input in order to unlock a mobile apparatus.

Figure 2A:
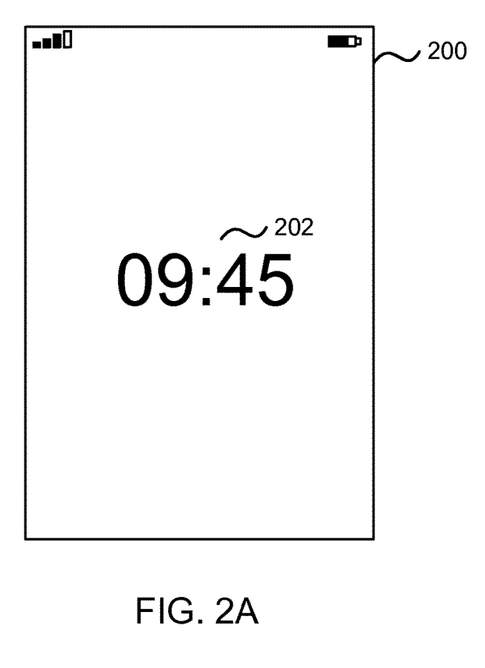
FIG. 2A is an example view on a display of a mobile apparatus when a user has been authenticated.

FIG. 2A is an example view 200 on a display of a mobile apparatus when a user has been authenticated. The view 200 disclosed in FIG. 2A is a simplified view where only time 202 is displayed, acting thus, for example, as a screen saver or glance screen. Normally, when a user is automatically authenticated using, for example, iris scanning or facial recognition, the view on the display proceeds to the starting view of the operating system of the mobile apparatus or to the view including the last used application before the mobile apparatus was locked. In the example illustrated in FIG. 2A, although the user has been authenticated, the view on the display does not change to the starting view of the operating system of the mobile apparatus or to the view including the last used application before the mobile apparatus was locked but displays only time information.

This is beneficial, for example, in a situation when the automatic authentication of the user is enabled in the mobile apparatus settings and the user only wants to check the time but does not want any other piece of information to be presented on the display and does not want to use any specific application with the mobile apparatus.

Figure 2B:
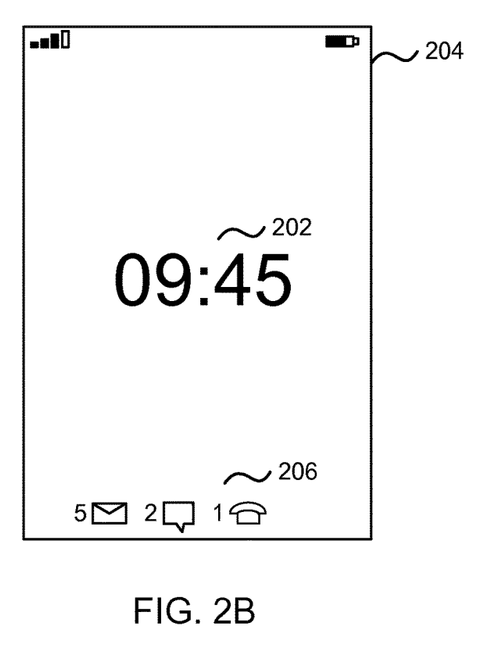
FIG. 2B is another example view on a display of a mobile apparatus when a user has been authenticated.

FIG. 2B is another example view 204 on a display of a mobile apparatus when a user has been authenticated. The view 204 is similar to the view 200 illustrated in FIG. 2A. In addition to time information 202, the view 204 includes also indicators 206 indicating, for example, the number of new emails, text messages and missed calls.

In one further example of FIG. 2A or 2B, the view 200 or 204 may be shown to the user already before the user is authenticated, thus acting as a glance screen which is visible on the display all the time. In this case, after the user authentication nothing may change on the display although the user has been authenticated.

Figure 2C:
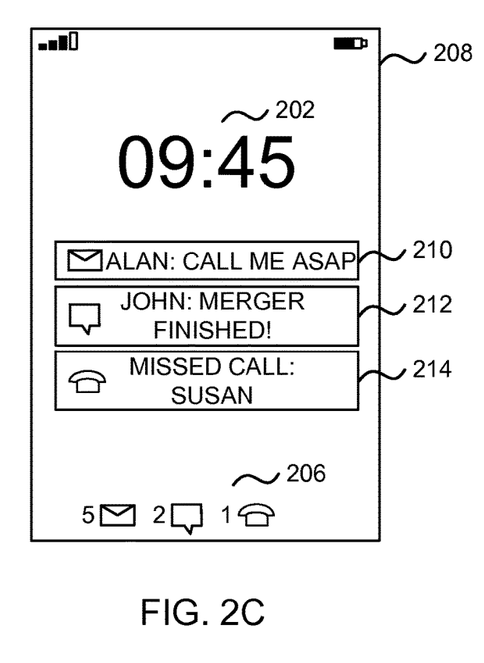
FIG. 2C is another example view on a display of a mobile apparatus when a user has been authenticated.

FIG. 2C is another example view on a display of a mobile apparatus when a user has been authenticated. The view 208 is similar to the view 204 illustrated in FIG. 2B but includes also more detailed user-specific information 210, 212, 214. In one example, the view 208 is displayed after the user has been authenticated. If someone else tries to use the mobile apparatus, he may be shown only the view 200 of FIG. 2A displaying only the time information since the user authentication failed.

In another example of FIG. 2C, a two-step authentication process may be used. After the user has been authenticated using a primary biometric authentication method, the user may be shown the view 200 of FIG. 2A or the view 204 of FIG. 2B. Only after authenticating the user using a secondary authentication method, the view 208 may be shown. If the view 204 of FIG. 2B is shown, the user sees that he has received new messages/calls. He may then decide that he wants some further information about the received messages/calls. After the user has been authenticated using a secondary authentication method, the additional information 210, 212, 214 is shown to the user. The user may initiate the second authentication method. If the mobile apparatus is Near Field Communication (NFC) enabled, the initiation may be done, for example, by providing an NFC chip including user data close to the mobile apparatus. The NFC chip may be incorporated, for example, into a watch, a ring etc. A skilled person understands that the NFC is only one possible example of a technique to be used to provide the secondary authentication. Another possibility is to use, for example, fingerprint authentication. The mobile apparatus may provide, for example, a mechanical button which incorporates a fingerprint detector.

Figure 2D:
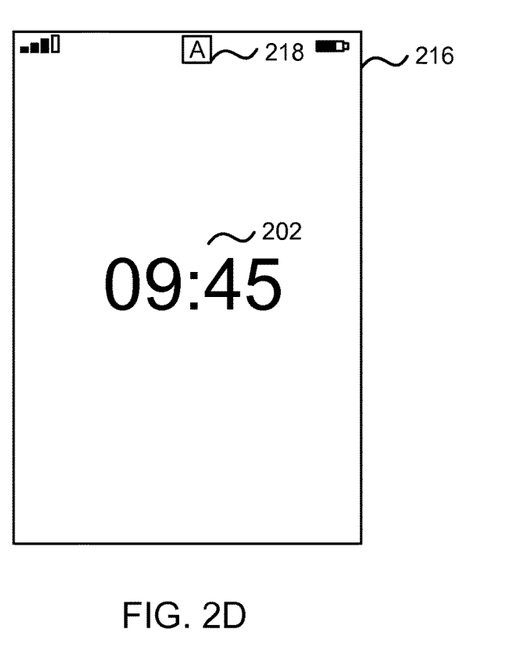
FIG. 2D is another example view on a display of a mobile apparatus when a user has been authenticated.

FIG. 2D is another example view 216 on a display of a mobile apparatus when a user has been authenticated. The view 216 is identical to the view 200 illustrated in FIG. 2A with the exception that the view 216 includes an indication 218 when the user has been authenticated. This enables the user to see when the biometric authentication performed on background was successful. The indication 218 may be any appropriate graphical indicator on the display.

In one example, a blank screen may be provided to the user prior to the user authentication. In other words, when a user is detected with a mobile apparatus, the blank screen may remain on the display of the mobile apparatus. The user is automatically authenticated and during the authentication, the blank screen is still provided to the user. After the user has been authenticated the locked state of the mobile apparatus in response to authenticating the user is automatically opened on background, and a screen, for example, disclosed in any of FIGS. 2A-2D may be shown to the user.

In one further example of any of FIGS. 2A-2D, the mobile apparatus may automatically enter a locked state again if receiving no further user input within a predetermined period of time after the user has been authenticated, for example, within 10 or 15 seconds. The user may also be able to adjust the time period in the settings of the mobile apparatus.

Figure 3:
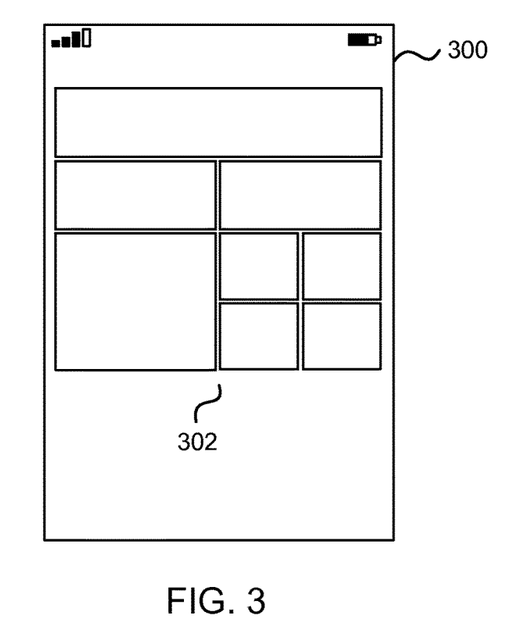
FIG. 3 is another example view on a display of a mobile apparatus when a user has been authenticated and an input has been received from a user.

In any of the examples of FIGS. 2A-2F, although the user is authenticated the disclosed solution avoids proceedings directly further to the operating system view where the user is able to user any application he wants. Only when the gives an additional user input, the view on the display of the mobile apparatus changes to the operating system view (a simplified example of which is illustrated in FIG. 3) or to the last used application view. Further, if the automatic user authentication is enabled and if the intention of the user is only to check, for example, the time (and not to proceed to the normal operating system view), this also saves the battery.

In a further example of the example of FIG. 2C, the user may be able to enable at least two secondary authentication methods. It may then be possible to separately configure for each secondary authentication method the user-specific information to be shown when the user is authenticated using the secondary authentication method. This makes it possible to establish, for example, different user-specific information profiles. For example, when a first type of secondary authentication method is used, home information may be shown to the user. When a second type of second authentication method is used, work information may be shown to the user.

FIG. 3 is an example view 300 on a display of a mobile apparatus when a user has been authenticated and an input has been received from a user. Before receiving the user input, the user may have been presented any of the views disclosed in FIGS. 2A-2D. The view 300 illustrates a normal operating system view relating to the unlocked state of the mobile apparatus. The view 300 includes a set of application tiles or icons 302, and the user may launch an application by selecting the tile or icon corresponding to the application. The user input may refer to any input from the user that causes the mobile apparatus to switch the view on the display to the normal operating system view, for example, a swipe across the display, selection of a button on the display etc.

Figure 4A:
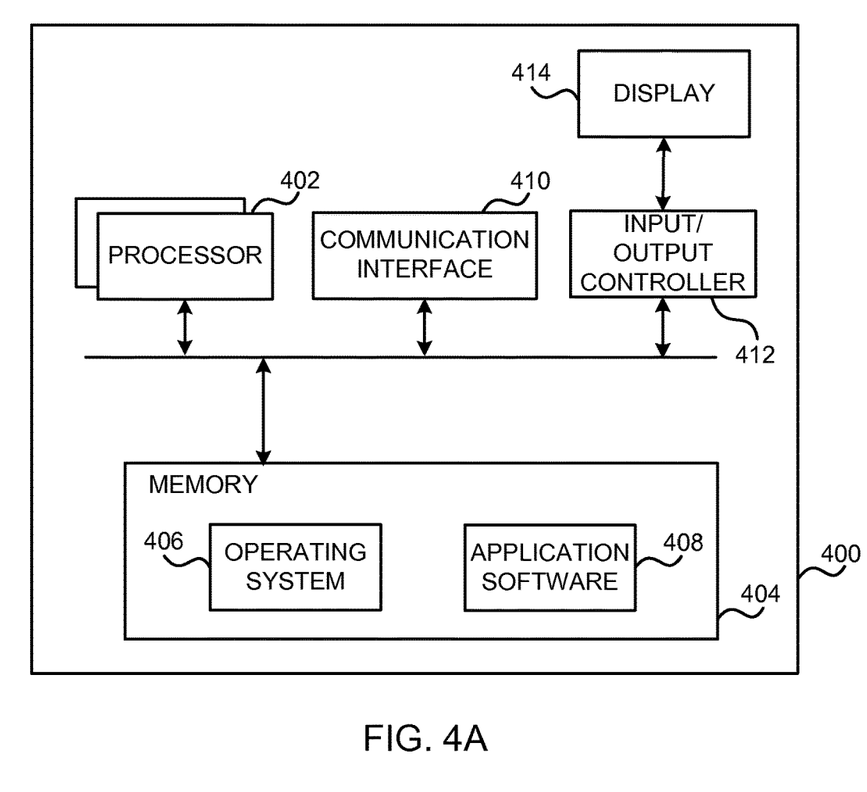
FIG. 4A is a block diagram of an example mobile apparatus.

FIG. 4A illustrates various components of an example mobile apparatus 400 which may be implemented as any form of a computing and/or electronic device. The mobile apparatus 400 may be used to implement the views disclosed in any of FIGS. 2A, 2B, 2C, 2D and 3. The mobile apparatus 400 is, for example, a smart phone, a mobile phone, a tablet computer etc.

The mobile apparatus 400 comprises one or more processors 402 which may be microprocessors, controllers or any other suitable type of processors for processing computer executable instructions to control the operation of the mobile apparatus 400. Platform software comprising an operating system 406 or any other suitable platform software may be provided at the mobile apparatus to enable application software 408 to be executed on the device.

Computer executable instructions may be provided using any computer-readable media that is accessible by the mobile apparatus 400. Computer-readable media may include, for example, computer storage media such as memory 404 and communications media. Computer storage media, such as memory 404, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 404) is shown within the mobile apparatus 400 it will be appreciated that the storage may be distributed or located remotely and accessed via a network or other communication link (e.g. using communication interface 412).

The mobile apparatus 400 may comprise an input/output controller 412 arranged to output display information to a display device 414 which may be separate from or integral to the mobile apparatus 400. The input/output controller 412 may also be arranged to receive and process input from one or more devices, such as a user input device (e.g. a keyboard, camera, microphone or other sensor). In one example, the display device 414 may also act as the user input device if it is a touch sensitive display device. The input/output controller 412 may also output data to devices other than the display device, e.g. a locally connected printing device.

The input/output controller 412 may be in communication with at least one sensor such as one or more cameras, an inertial measurement unit and/or other sensors. This enables the mobile apparatus 400 to receive data observed by the sensors and to control the sensors.

The input/output controller 412, display device 414 and optionally user input device may comprise natural user interaction (NUI) technology which enables a user to interact with the mobile apparatus in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence.

The processor 402 may be configured to detect a user with a mobile apparatus, the mobile apparatus being in a locked state, authenticate the user automatically on background using a primary biometric authentication method, open the locked state of the mobile apparatus in response to authenticating the user automatically on background, and providing a screen relating to the locked state on the display 414 although the locked state has been opened.

Figure 4B:
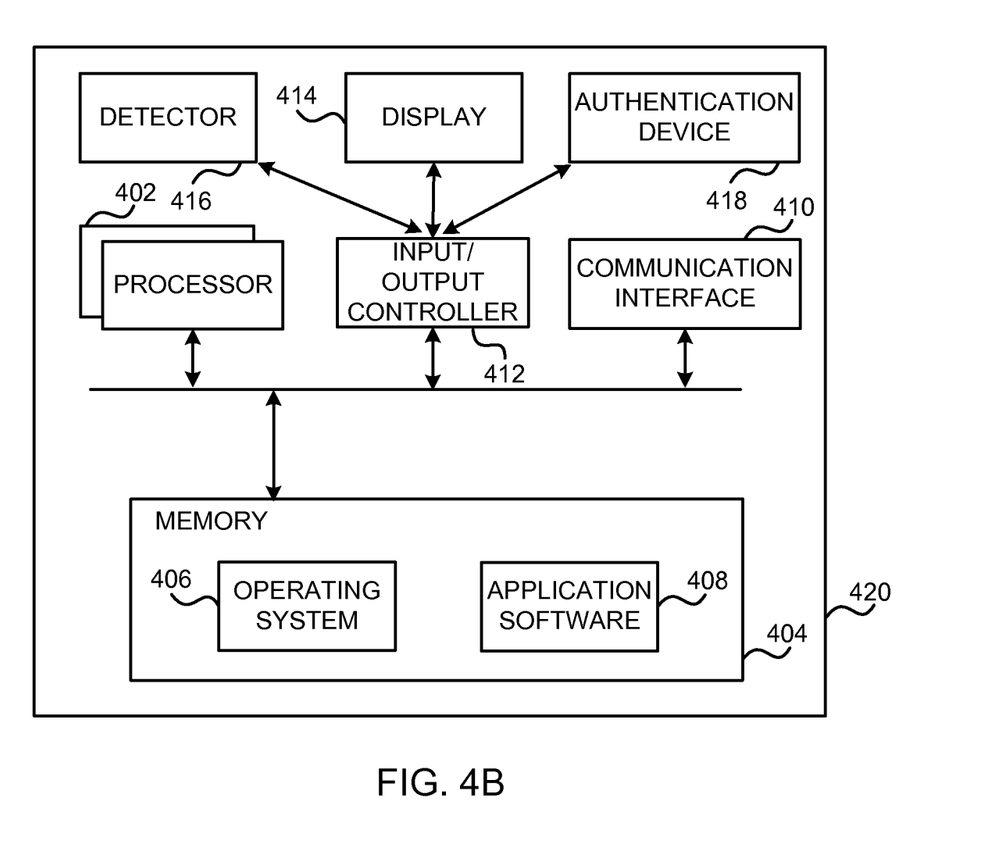
FIG. 4B is a block diagram of another example mobile apparatus.

FIG. 4B illustrates various components of an example mobile apparatus 420 which may be implemented as any form of a computing and/or electronic device. The mobile apparatus 420 may be used to implement the views disclosed in any of FIGS. 2A, 2B, 2C, 2D and 3.

The mobile apparatus 420 disclosed in FIG. 4B is similar to the mobile apparatus disclosed in FIG. 4A with the exception that it comprises also at least one detector 416 and at least one authentication device 418. For the same reference numbers reference is made to the description of FIG. 4A The processor 402 may be configured to detect a user with the at least one detector 416, the mobile apparatus 420 being in a locked state, authenticate the user automatically on background using a primary biometric authentication method with the at least one authentication device 418, open the locked state in response to authenticating the user automatically on background, and provide a screen relating to the locked state on the display 414 although the locked state has been opened.

The at least one detector 416 may comprise one or more of the following: a camera, a fingerprint detector, one or more grip detectors configured to detect when the user holds the mobile apparatus in his hand, an accelerometer etc. The at least one authentication device 418 may comprise one or more of the following: a camera, a microphone, a fingerprint detector etc. The camera may be used when the authentication is based on iris analysis or when facial recognition based on the image data provided by the camera is used for authenticating the user. When voice recognition is used as the authentication method, signals from the microphone may be used.

An example of a method comprises detecting a user with a mobile apparatus, the mobile apparatus being in a locked state; authenticating the user with the mobile apparatus automatically on background using a primary biometric authentication method; opening the locked state of the mobile apparatus in response to authenticating the user automatically on background; and providing a screen relating to the locked state on a display although the locked state has been opened.

In one example the screen relating to the locked state is a lock screen or a glance screen.

In one example, alternatively or in addition, the method comprises receiving an input from the user; and providing a normal operating system view relating to the unlocked state on the display.

In one example, alternatively or in addition, the method comprises providing user specific information on the screen in response to authenticating the user.

In one example, alternatively or in addition, the method comprises automatically locking the mobile apparatus if receiving no further user input within a predetermined period of time after the user has been authenticated.

In one example, alternatively or in addition, the method comprises providing a lock screen, a blank screen or a glance screen on the display prior to authenticating the user.

In one example, alternatively or in addition, the method comprises providing an indication on the screen to the user when the user has been authenticated.

In one example, alternatively or in addition, the primary biometric authentication method comprises at least one of the following: iris authentication; authentication based on facial recognition; and fingerprint authentication.

In one example, alternatively or in addition, the method comprises authenticating the user with the mobile apparatus using a secondary authentication method after the user has been authenticated using the primary biometric authentication method; and providing user-specific information on the screen in response to authenticating the user using the secondary authentication method.

In one example, alternatively or in addition, the method comprises enabling at least two secondary authentication methods; linking specific sets of user-specific information to each of the at least two secondary authentication methods; and wherein providing user-specific information comprises providing the user-specific information on the screen linked to the secondary authentication method in response to authenticating the user using the secondary authentication method.

An example of a mobile apparatus comprises a display, at least one processor, and at least one memory storing program instructions that, when executed by the at least one processor, cause the mobile apparatus to detect a user, the mobile apparatus being in a locked state; authenticate the user automatically on background using a primary biometric authentication method; open the locked state in response to authenticating the user automatically on background; and provide a screen relating to the locked state on the display although the locked state has been opened.

In one example the screen relating to the locked state is a lock screen or a glance screen.

In one example, alternatively or in addition, the at least one memory storing program instructions that, when executed by the at least one processor, cause the mobile apparatus to receive an input from the user, and provide a normal operating system view relating to the unlocked state on the display.

In one example, alternatively or in addition, the at least one memory storing program instructions that, when executed by the at least one processor, cause the mobile apparatus to provide user specific information on the screen in response to authenticating the user.

In one example, alternatively or in addition, the at least one memory storing program instructions that, when executed by the at least one processor, cause the mobile apparatus to automatically lock the mobile apparatus if receiving no further user input within a predetermined period of time after the user has been authenticated.

In one example, alternatively or in addition, the at least one memory storing program instructions that, when executed by the at least one processor, cause the mobile apparatus to provide a lock screen, a blank screen or a glance screen on the display prior to authenticating the user.

In one example, alternatively or in addition, the at least one memory storing program instructions that, when executed by the at least one processor, cause the mobile apparatus to provide an indication on the screen to the user when the user has been authenticated.

In one example, alternatively or in addition, the primary biometric authentication method comprises at least one of the following: iris authentication; authentication based on facial recognition; and fingerprint authentication.

In one example, alternatively or in addition, the at least one memory storing program instructions that, when executed by the at least one processor, cause the mobile apparatus to: authenticate the user with the mobile apparatus using a secondary authentication method after the user has been authenticated using the primary biometric authentication method; and provide user specific information on the screen in response to authenticating the user using the secondary authentication method.

In one example, alternatively or in addition, the at least one memory storing program instructions that, when executed by the at least one processor, cause the mobile apparatus to: enable at least two secondary authentication methods; link specific sets of user-specific information to each of the at least two secondary authentication methods; and wherein providing user-specific information comprises providing the user-specific information on the screen linked to the secondary authentication method in response to authenticating the user using the secondary authentication method.

An example of a mobile apparatus comprises a display, a detector, an authentication device, at least one processor, and at least one memory storing program instructions that, when executed by the at least one processor, cause the mobile apparatus to detect a user with the detector, the mobile apparatus being in a locked state; authenticate the user automatically on background using a primary biometric authentication method with the authentication device; open the locked state in response to authenticating the user automatically on background; and provide a screen relating to the locked state on the display although the locked state has been opened.

In one example, the at least one memory storing program instructions that, when executed by the at least one processor, cause the mobile apparatus to provide user specific information on the screen in response to authenticating the user.

An example of a mobile apparatus comprises means for detecting a user with a mobile apparatus, the mobile apparatus being in a locked state, means for authenticating the user with the mobile apparatus automatically on background using a primary biometric authentication method, means for opening the locked state of the mobile apparatus in response to authenticating the user automatically on background, and means for providing a screen relating to the locked state on a display although the locked state has been opened. The above mentioned means may be implemented using at least processor or at least one processor and at least one memory connected to the at least one processor.

In one example, there is provided a computer program or a computer program product comprising program code instructions, which when executed by a processing unit, perform the following: detecting a user with a mobile apparatus, the mobile apparatus being in a locked state; authenticating the user with the mobile apparatus automatically on background using a primary biometric authentication method; opening the locked state of the mobile apparatus in response to authenticating the user automatically on background; and providing a screen relating to the locked state on a display although the locked state has been opened.

In one example, the computer program is embodied on a computer-readable medium.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs).

The functions described herein performed by a controller may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Any range or device value given herein may be extended or altered without losing the effect sought.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages.

Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various examples have been described above with a certain degree of particularity, or with reference to one or more individual examples, those skilled in the art could make numerous alterations to the disclosed examples without departing from the spirit or scope of this specification. In particular, the individual features, elements, or parts described in the context of one example, may be connected in any combination to any other example also.

The invention claimed is:

1. A method comprising:
    displaying a particular screen on an entire display of a mobile apparatus when the mobile apparatus is in a locked state,
    the particular screen displaying only a first set of indicators;
    detecting a user with the mobile apparatus;
    authenticating the user with the mobile apparatus automatically on background using a primary biometric authentication method;
    unlocking the locked state of the mobile apparatus in response to authenticating the user automatically on background,
    the unlocking placing the mobile apparatus in an unlocked state; and
    based on unlocking the locked state, maintaining the display of the particular screen displaying only the first set of indicators; and
    after authenticating the user automatically on background, receiving an input from the user; and
    based on the received input, changing a view on the particular screen to a normal operating system view different from the particular screen and relating to an unlocked state of the mobile apparatus, enabling user access to applications which were not accessible during the locked state.

2. A method according to claim 1, wherein the normal operating system view comprises a set of application tiles or application icons.

3. A method according to claim 1, wherein the input is one or more of the following: a swipe across a display, a touch on the display, and a selection of a button on the display.

4. A method according to claim 1, comprising:
    providing user specific information on the screen in response to receiving the input from the user.

5. A method according to claim 1, comprising:
    automatically locking the mobile apparatus if receiving no further user input within a predetermined period of time after the user has been authenticated.

6. A method according to claim 1, wherein the display of the predetermined screen is the same in the locked state and after authentication.

7. A method according to claim 1, wherein the primary biometric authentication method comprises at least one of the following:
    iris authentication;
    authentication based on facial recognition; and
    fingerprint authentication.

8. A method according to claim 1, comprising:
    wherein the input is a secondary authentication method; and
    providing user-specific information on the screen in response to authenticating the user using the secondary authentication method.

9. A method according to claim 8, comprising:
    enabling at least two secondary authentication methods, wherein the input is one of the at least two authentication methods;
    linking specific sets of user-specific information to each of the at least two secondary authentication methods; and
    wherein providing user-specific information comprises providing the user-specific information on the screen linked to the one of the at least two secondary authentication methods in response to authenticating the user using the one of the at least two secondary authentication methods.

10. A mobile apparatus comprising:
    a display;
    at least one processor, and
    at least one memory storing program instructions that, when executed by the at least one processor, cause the mobile apparatus to:
    display only a particular screen when the mobile apparatus is in a locked state, the particular screen being the only screen displayed in the locked state;
    the particular screen displaying only a first set of indicators;
    detect a user while the mobile apparatus is in the locked state;
    authenticate the user automatically on background using a primary biometric authentication method;
    unlock the locked state in response to authenticating the user automatically on background, the unlocking placing the mobile apparatus in an unlocked state; and based on unlocking the locked state maintain only displaying the particular screen that displays only the first set of indicators; and after authenticating the user automatically on background, receiving an input from the user; and based on the received input, changing a view on the particular screen to a normal operating system view different from the particular screen and relating to an unlocked state of the mobile apparatus, enabling user access to applications which were not accessible during the locked state.

11. A mobile apparatus according to claim 10, wherein the normal operating system view comprises a set of application tiles or application icons.

12. A mobile apparatus according to claim 10, wherein the input is one or more of the following: a swipe across a display, a touch on the display, and a selection of a button on the display.

13. A mobile apparatus according to claim 10, wherein the at least one memory storing program instructions that, when executed by the at least one processor, cause the mobile apparatus to:
provide user specific information on the screen in response to the user input.

14. A mobile apparatus according to claim 10, wherein the at least one memory storing program instructions that, when executed by the at least one processor, cause the mobile apparatus to:
automatically lock the mobile apparatus if receiving no further user input within a predetermined period of time after the user has been authenticated.

15. A mobile apparatus according to claim 10, wherein the at least one memory storing program instructions that, when executed by the at least one processor, cause the mobile apparatus to:
maintain a display of the particular screen if receiving no further user input within a predetermined period of time after the user has been authenticated.

16. A mobile apparatus according to claim 10, wherein the at least one memory storing program instructions that, when executed by the at least one processor, cause the mobile apparatus to:
provide no indication on the screen to the user when the user has been authenticated.

17. A mobile apparatus according to claim 10, wherein the primary biometric authentication method comprises at least one of the following:
iris authentication;
authentication based on facial recognition; and
fingerprint authentication.

18. A mobile apparatus according to claim 10, wherein the user input is a secondary authentication method; and wherein the at least one memory storing program instructions that, when executed by the at least one processor, cause the mobile apparatus to provide user specific information on the screen in response to authenticating the user using the secondary authentication method.

19. A mobile apparatus according to claim 18, wherein the at least one memory storing program instructions that, when executed by the at least one processor, cause the mobile apparatus to:
enable at least two secondary authentication methods, the user input being one of the at least two secondary authentication methods;
link specific sets of user-specific information to each of the at least two secondary authentication methods; and
wherein providing user-specific information comprises providing the user-specific information on the screen linked to the one of the at least two secondary authentication methods in response to authenticating the user using the one of the at least two secondary authentication methods.

20. A mobile apparatus comprising:
a display;
a detector;
an authentication device;
at least one processor, and
at least one memory storing program instructions that,
when executed by the at least one processor,
cause the mobile apparatus to:
display a particular screen on an entire display of the mobile apparatus when the mobile apparatus is in a locked state,
the particular screen displaying only a first set of indicators;
detect a user with the detector while the mobile apparatus is in the locked state;
authenticate the user automatically on background using a primary biometric authentication method with the authentication device;
unlock the locked state in response to authenticating the user automatically on background, the unlocking placing the mobile apparatus in an unlocked state; and
based on unlocking the locked state maintain the display of the particular screen displaying only the first set indicators until receiving input from the user,
the input changing a view on the particular screen to a normal operating system view different from the particular screen and relating to an unlocked state of the mobile apparatus, enabling user access to applications which were not accessible during the locked state.

* * * * *